Sept. 13, 1949.   C. F. VEENEMANS ET AL   2,482,043
GETTERING FOR DISCHARGE TUBES
Filed May 14, 1946
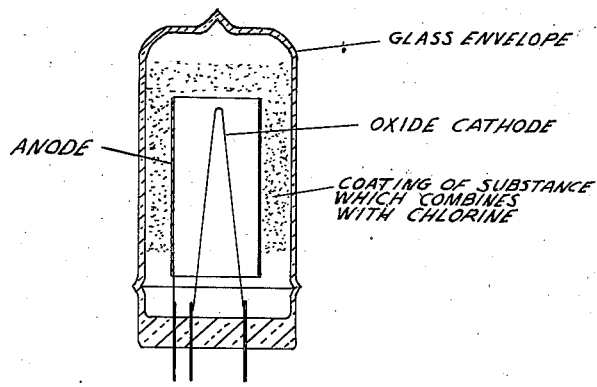
INVENTORS
CORNELIS FREDERIK VEENEMANS &
HUGO CHRISTIAAN HAMAKER
BY
ATTORNEY.

Patented Sept. 13, 1949

2,482,043

UNITED STATES PATENT OFFICE 2,482,043

GETTERING FOR DISCHARGE TUBES

Cornelis Frederik Veenemans and Hugo Christiaan Hamaker, Eindhoven, Netherlands, assignors, by mesne assignments, to Hartford National Bank and Trust Company, Hartford, Conn., as trustee Application May 14, 1946, Serial No. 669,513
In the Netherlands May 2, 1942

Section 1, Public Law 690, August 8, 1946
Patent expires May 2, 1962

3 Claims. (Cl. 250—27.5)

In connection with electric discharge tubes it has for a long time been a problem to arrange for the optimum emission of an oxide cathode arranged internally of the tube, that is to say a cathode whose emitting layer is formed by one or more oxides of the alkaline or alkaline earth metals, which oxides are generally developed by the application and decomposition of the carbonate of hydroxide. It is known to use, in these tubes, gas-combining substances or getters by which harmful gases or vapours developing in the tube while it is in use or in the last stage of the manufacture can be taken up.

Exhaustive experiments have been undertaken by the applicants in connection with the presence of various gases or vapours in these tubes and the effect thereby produced on the oxide cathode. It has thus been revealed that one of the constituents most harmful to the cathode is chlorine and that this element either free or combined is developed in appreciable quantities in the tube and it is not absorbed by the getter, at least not to a sufficient extent. As revealed by various experiments, it is not improbable that the source of this chlorine is to be seen in the presence of chlorine compounds, particularly of chlorides, in the glass of the tube wall and that the harmful action occurs during the manufacture of the tube. Upon heating of the wall, for example during the deprivation of gases, this chloride may indeed be transformed in the following manner:

the hydrochloric acid vaporising from the wall and, jointly with undecomposed barium carbonate which is already present on the cathode, forming

The barium chloride formed leaves the cathode by evaporation during the decomposition of the carbonate and deposits on the anode. When the cathode is formed, this barium chloride is decomposed by the bombardment of electrons during which chlorine contacts with the active barium on the cathode, with the result that barium chloride is again produced, which again may escape by evaporation to the anode and so forth; the cathode is poisoned by this process. Now, it might be imagined that these phenomena would not be troublesome if the tube contained substances capable of combining with chlorine or hydrochloric acid; thus, for example at a given point in the tube a getter could be arranged for these substances by which the hydrochloric acid developed from the bulb wall could be fixed. It is now found that these means are not effective or at least are insufficiently effective and that the use thereof does not permit of avoiding the reaction hereinbefore described between the hydrochloric acid and the barium carbonate, this being due to the fact that the carbonate itself acts as a hydrochloric acid getter. Now, these difficulties can be obviated by the use of a discharge tube according to the invention. In such a tube whose wall is at least partially of glass and which comprises an electrode system including an oxide cathode the inside of the glass wall has applied to it a substance which combines with chlorine and chlorine compounds.

What is particular about this precaution is that the production of chlorine-containing compounds internally of the tube is avoided due to the fact that these compounds are fixed directly near the point at which they are developed; obviously, the substance applied has to be chosen in such manner that other products detrimental to the emission of the cathode are not produced.

For this purpose, the wall has applied to it such substances that if upon reaction with chlorine-containing compounds volatile products are evolved these products do not produce any harmful effect on the emission of the cathode and particularly do not react with the undecomposed alkaline earth salt which during the removal of gases from the bulb is already present on the cathode. The term "volatile products" is to be understood to mean the normal gases and vapours that develope during the removal of gases and are to be removed by pumping, such as vapour, carbonic acid, hydrogen and carbon oxide.

Suitable substances and groups of substances capable of being applied to the wall for the purpose here described are, for example, basic oxides, such as calcium oxide, zinc oxide and similar hydroxides, for example potassium or sodium hydroxide, salts, particularly carbonates and some metals, such as zinc, lead and so forth. Particularly good results are obtained by the use of a thin layer of potassium or sodium hydroxide.

Since in this case it is necessary that the chlorine-containing substances evolved by all parts of the glass wall should be combined immediately—it is highly desirable that the whole surface of these glass component members or at least the greater part thereof should be coated on the inside with a thin layer of the active substance. It is obvious that the substance applied has also to be chosen in such manner that at the temperatures occurring on the inside of the glass wall, which generally are not in excess of 300 to 350° C., harmful gases or vapours are not formed.

A layer of a substance according to the invention may be obtained in the following manner. Before the bulb of a discharge tube is placed on the stem a thin layer of potassium hydroxide is applied to the inner wall of this bulb either by means of the immersion process or by a spraying process. In this case, the immersion or spraying liquid is formed by a solution of potassium hydroxide in alcohol; after evaporation of the alcohol a clearly visible layer of very low thickness remains. When during the manufacture of the tube the bulb wall is then heated in order to remove the occluded gases the hydrochloric acid thus evolved is fixed by the potassium hydroxide with the production of potassium chloride, which is not decomposed or vaporised at the temperature prevailing at these points and of vapour, which escapes and is pumped off. After the removal of gases from the various wall parts and the electrodes it is possible, without any risk of poisoning the cathode, to decompose the carbonate present thereon to form oxide, it being then possible to finish the tube in the normal manner.

An electron discharge tube in accordance with the invention is shown in the drawing in which a glass envelope containing an anode and an oxide cathode has the inner surface thereof provided with a gettering substance capable of chlorine fixation.

We claim:

1. An electron discharge tube comprising an envelope enclosing an evacuated space and having glass wall portions, and a layer of a gettering substance capable of chlorine fixation on substantially the entire inner surface of said glass wall portions.

2. An electron discharge tube comprising an envelope enclosing an evacuated space and having glass wall portions, and a layer on substantially the entire inner surface of said glass wall portions of a gettering substance capable of chlorine fixation comprising a material chosen from the group consisting of potassium hydroxide and sodium hydroxide.

3. An electron discharge tube comprising an envelope enclosing an evacuated space and having glass wall portions, a layer on substantially the entire inner surface of said glass wall portions of a gettering substance capable of chlorine fixation chosen from the group consisting of basic oxides, hydroxides, and carbonates.

CORNELIS FREDERIK VEENEMANS.
HUGO CHRISTIAAN HAMAKER.

REFERENCES CITED

The following references are of record in the file of this patent:

UNITED STATES PATENTS

| Number | Name | Date |
| --- | --- | --- |
| 1,552,128 | Ettinger et al. | Sept. 1, 1925 |
| 1,552,310 | Kayko | Sept. 1, 1925 |
| 1,897,471 | Foulke | Feb. 14, 1933 |